United States Patent
Su et al.

(10) Patent No.: US 10,148,389 B1
(45) Date of Patent: Dec. 4, 2018

(54) DETECTION AND IDENTIFICATION OF SYNCHRONIZING SIGNALS EMBEDDED IN VOICE OR DATA

(71) Applicant: The United States of America, as represented by the Secretary of the Army, Washington, DC (US)

(72) Inventors: Wei Su, Bel Air, MD (US); Muhammed Karim, Ocean Township, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 875 days.

(21) Appl. No.: 14/011,815

(22) Filed: Aug. 28, 2013

(51) Int. Cl.
 *H04L 1/00* (2006.01)
 *H04Q 1/46* (2006.01)
 *H04Q 1/45* (2006.01)
 *H04M 7/12* (2006.01)

(52) U.S. Cl.
 CPC .......... *H04L 1/0039* (2013.01); *H04Q 1/46* (2013.01); *H04M 7/1295* (2013.01); *H04Q 1/45* (2013.01)

(58) Field of Classification Search
 None
 See application file for complete search history.

(56) References Cited

U.S. PATENT DOCUMENTS

| | | | |
|---|---|---|---|
| 6,873,701 B1 | 3/2005 | Tian et al. | |
| 2002/0080951 A1* | 6/2002 | Tanrikulu | H04L 29/06027 379/350 |
| 2003/0224741 A1* | 12/2003 | Sugar et al. | 455/115.1 |
| 2004/0047370 A1* | 3/2004 | Pessoa | H04Q 1/4575 370/526 |
| 2006/0056496 A1* | 3/2006 | Smee et al. | 375/148 |
| 2006/0217166 A1 | 9/2006 | Swanson | |
| 2007/0060061 A1* | 3/2007 | Sampath | 455/63.1 |
| 2007/0091873 A1 | 4/2007 | LeBlanc et al. | |
| 2007/0116242 A1 | 5/2007 | Chen | |
| 2010/0008493 A1 | 1/2010 | Marum et al. | |
| 2010/0290334 A1* | 11/2010 | Marx | 370/210 |
| 2011/0103573 A1* | 5/2011 | Susan | H04Q 1/4575 379/395.01 |

* cited by examiner

*Primary Examiner* — Joshua Kading
(74) *Attorney, Agent, or Firm* — Ronald Krosky; Azza Jayaprakash (57) ABSTRACT

Various embodiments associated with a reference signal are described. When a set of user information embedded with a reference signal is received by a system, a classification of the signal may not be known by the system. Therefore, the system can determine a classification of the reference signal. The reference signal can be passed through a low-pass filter and then an algorithm can be employed to identify the classification of the reference signal. Once the classification of the reference signal is known, the user information can be better used by the system.

20 Claims, 11 Drawing Sheets

DETECTION AND IDENTIFICATION OF SYNCHRONIZING SIGNALS EMBEDDED IN VOICE OR DATA

GOVERNMENT INTEREST

The innovation described herein may be manufactured, used, imported, sold, and licensed by or for the Government of the United States of America without the payment of any royalty thereon or therefor.

CROSS-REFERENCE

The subject application is related to U.S. patent application Ser. No. 14/011,813 that was filed on Aug. 28, 2013 with a title of "RECOVERY OF DTMF TONES IN THE PRESENCE OF PERIODIC INTERFERENCE AND OBSTRUCTION" and U.S. patent application Ser. No. 14/011,813 is herein incorporated by reference.

BACKGROUND

A transmitter can send out a communication signal. A receiver that receives the communication signal, whether the receiver is a receiver intended by the transmitter or not, can attempt to process the communication signal. However, if at least some information about the communication signal is not known to the receiver, then processing the communication signal can be difficult and ultimately it can be difficult to use the content of the communication signal.

SUMMARY

A system is disclosed comprising an identification component configured to determine if a reference signal is a single-frequency signal or a multi-frequency signal. The system also comprises a single-frequency measurement component configured to make a measurement of a frequency of the reference signal when the reference signal is the single-frequency signal, a single-frequency classification component configured to determine a single-frequency classification of the reference signal based, at least in part, on the measurement when the reference signal is the single-frequency signal, and a single-frequency confidence component configured to determine a confidence of the single-frequency classification, where a notice identifying the single-frequency classification is caused to be outputted in response to the confidence of the single-frequency classification meeting a single-frequency threshold value. Additionally, the system comprises a multi-frequency classification component configured to determine a multi-frequency classification of the reference signal when the reference signal is the multi-frequency signal, a multi-frequency measurement component configured to obtain a first result from a first band centered on a first frequency of the reference signal and configured to obtain a second result from a second band centered on a second frequency of the reference signal, where the first frequency and the second frequency are discrete frequencies. The system additionally comprises a multi-frequency confidence component configured to determine a confidence of the multi-frequency classification through use of the first result and the second result, where a notice identifying the multi-frequency classification is caused to be outputted in response to the confidence of the multi-frequency classification meeting a multi-frequency threshold value. Also, the system comprises a processor configured to execute at least one instruction related to the identification component, the single-frequency measurement component, the single-frequency classification component, the single-frequency confidence component, the multi-frequency classification component, the multi-frequency measurement component, the multi-frequency confidence component, or a combination thereof.

A method is disclosed comprising discovering a confidence threshold, detecting a preferred frame of a repeating frequency portion of a signal, and constructing a segment of ordered frames of the signal that are contiguous, where the ordered frames include the preferred frame. The method also comprises computing, via a processor, a first metric set for the segment, where the first metric set is based on a first discrete frequency of the signal and computing, via the processor, a second metric set for the segment, where the second metric set is based on a second discrete frequency of the signal. The method additionally comprises determining a first confidence level of a first sub-segment of the segment through use of the first metric set and determining a second confidence level of a second sub-segment of the segment through use of the second metric set, where the first sub-segment and the second sub-segment are different sub-segments. Further, the method comprises calculating, via the processor, a total confidence level through averaging at least the first confidence level and the second confidence level and determining if the total confidence level meets the confidence threshold. In addition, the method comprises recognizing a classification of the signal in response to the total confidence level meeting the confidence threshold and causing an output that identifies the signal as a signal of the classification.

A signal classifier is disclosed that is configured to perform a method, the method comprising discovering a confidence threshold, detecting a preferred frame of a particular frequency reference portion of a radio frequency signal, and constructing a segment of ordered frames of the radio frequency signal that are contiguous, where the ordered frames include the preferred frame. The method also comprises identifying that radio frequency signal has a single frequency and identifying the single frequency of the radio frequency signal. The method further comprises establishing a cutoff frequency to be above the single frequency and subjecting the radio frequency signal to the cutoff frequency that is above the single frequency to produce a signal output. Additionally, the method comprises normalizing the signal output to produce a normalized signal output and demodulating the radio frequency signal through use of the normalized signal output to produce a baseband signal. Further, the method comprises determining a proposed classification of the baseband signal, determining a confidence level of the proposed classification, and determining if the confidence level meets the confidence threshold. In addition, the method comprises recognizing the proposed classification as a recognized classification of the signal in response to the total confidence level meeting the confidence threshold and causing an output that identifies the signal as a signal of the recognized classification.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

When a set of user information embedded with a reference signal (e.g., tone or pattern) is received by a system after transmission over a noisy channel (e.g. a communication channel that is characterized by additive white Gaussian noise), a classification of the signal may not be known by the system. To make this classification, the received signal can be passed through an appropriate filter and then an algorithm can be employed to identify the classification of the reference signal. Once the classification of the reference signal is known, the user information can be better used by the system.

In one example, a communication signal can be received that includes the reference signal that appears directly in baseband or in a modulated Radio Frequency carrier. The reference signal (e.g., that is embedded in voice or data) can be a repeating characteristic of the communication signal that functions as a synchronization signal. A determination can be made if the reference signal includes a single frequency or multiple frequencies (e.g., determine a frequency peak number). Along with this determination, the value of the frequency or frequencies can be determined. The combination of the number of frequencies (e.g., one repeating frequency, two repeating frequencies, etc.) and values of the frequencies (e.g., as expressed by Hertz) can identify the classification of the reference signal and thus a classification of the communication signal. With this information known the other content of the communication signal can be better used.

In one example, the communication signal can be analyzed to determine the reference signal. If the reference signal is repeating, multiple instances of the reference signal can appear in the communication signal. These instances of the reference signal can be identified and evaluated to find a best reference signal for use in aspects disclosed herein (e.g., a reference signal with lowest interference or best Signal to Noise ratio).

In one example, the reference signal can be identified as a multi-frequency signal with two frequencies. Further, the peaks can be identified as values that correspond to a telephone number pad. As such, a determination can be made that the reference signal is a dual-tone multi-frequency signal and that the communication signal is an identifier of a number pressed on the telephone number pad. The identified number can be stored and used to identify an overall telephone number being submitted by a user.

Various aspects disclosed herein have applications in both commercial and military communication systems. In one example, aspects can be practiced to identify synchronizing patterns and preambles preceding user data in data communication protocols, signaling information in public telephony/personal radio communication/military communications, supervisory audio tones in cellular telephony, predefined bit sequences on a specific channel (e.g. the common pilot channel of a W-CDMA (Wideband Code Division Multiple Access) network) that provide the phase reference of other associated channels, and so on.

In one example, a system can be transmitting voice, data, image or video through a signal. Embedded in this signal are one or more synchronizing patterns which identify the beginning of a frame, or form a preamble to user data, a predefined bit sequence that provides a timing reference, signaling information such as dual tone multi-frequency signals, and so on. In some instances these synchronizing signals are composed of a single frequency. In other instances, these synchronizing signals can be composed of multiple frequencies. As a general case, the synchronizing signal x(t) may be represented at the baseband as:

$$x(t) = \sum_{n=1}^{N'} a_n \cos(2\pi f_n t + \theta_n)$$

In this example, the synchronizing signal includes N' frequencies. For single frequency signals N'=1 and for multi-frequency signals N'≥2. An algorithm can be employed (e.g., a system, that in one embodiment is at least part hardware can employ such an algorithm) that is general enough to detect and identify x(t) for signals with different frequencies with a high level of confidence when x(t) is embedded in user information. Examples of reference signals (synchronizing signals) can be: Signaling tone in Advanced Mobile Phone Service (AMPS)—with a frequency of about 10 kHz (kilohertz); Supervisory audio tones (SAT) in AMPS—with frequencies of about 5970, 6000, and 6300 Hz; Common pilot channel in W-CDMA—with a frequency of about 30 kbps; Preambles in CDP radios—with a frequency of about 4 kHz; or Signaling in public switched telephone networks or cordless phones—with a dual-tone multi-frequency.

One example algorithm can define a threshold to be used for a confidence level and sampling frequency fs. Usually this threshold should be set at 0.75 or higher. The algorithm can also detect the best segments of the signal. Best segment detection can be performed through division of an entire collected signal into frames, each N samples long. N can depend upon the frequency or bit rate of the synchronizing sequence detected as well as the sampling rate used. In one example, if the sampling rate is 64,000 Hz, then N may be 4096-8192. The algorithm can compute the mean value of the signal in individual frames (e.g., each frame) and arrange the frames in the descending order of their mean values.

An algorithm (e.g., used by a component disclosed herein, a component disclosed herein, etc.) can construct a segment using a first few of the ordered frames while confirming that the frames used are contiguous. The algorithm can find the first and last sample of the segment constructed this way. The algorithm can also split the above segment into smaller sub-segments (for example 4096 samples wide when the segment is 8192 samples wide). If the received signal is already in the baseband, the algorithm can compute its PSD (power spectral density) for a range of frequencies in increments of 4 Hz. If the received signal is RF (radio frequency), the signal can be down-converted to an intermediate frequency and properly filtered, and the resulting output can be normalized and demodulated to recover the baseband signal. Then the algorithm can compute a PSD of the recovered signal at increments of 4 Hz. If the synchronizing signal is composed of a single frequency, the maximum frequency to be used in this computation of PSD can be set slightly above that frequency. If the synchronizing signal is composed of multiple frequencies, the maximum frequency to be used in this computation of PSD can be set slightly above the highest of the multiple frequencies.

The algorithm can check if a sub-segment split from the segment discussed above contains the desired synchronizing signal. In one example, the synchronizing signal is composed of N discrete frequencies (e.g., $f_1, f_2, \ldots, f_{N'}$). The algorithm can construct bandwidths $B_1=(f_2-f_1)/2$, $B_2=(f_3-f_2)/2$, $B_3=(f_4-f_3)/2$ and so on. The algorithm can also compute peak power spectral densities in band $(-B_1,B_2)$ around $f_1$, $(-B_2,B_3)$ around $f_2$, $(-B_3,B_4)$ around $f_4$, and so on, and the corresponding frequency of the peak in bands (e.g., each band). The algorithm can also determine a parameter, such as by integrating the PSD to obtain E1 in a 20 Hz band centered on the first peak as well as integrating the PSD to get E2 in an 80-Hz band centered on that peak to produce $conf_1=E1/E2$. The algorithm can compute $conf_2$ around a 2nd peak, $conf_3$ around a third peak, and so on. The algorithm can take their average $(conf_1+conf_2+ \ldots +conf_{N'})/N'$ and set the average as the confidence level. The algorithm can declare that the reference pattern is embedded in the received signal if the confidence level is above the desired threshold.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1:
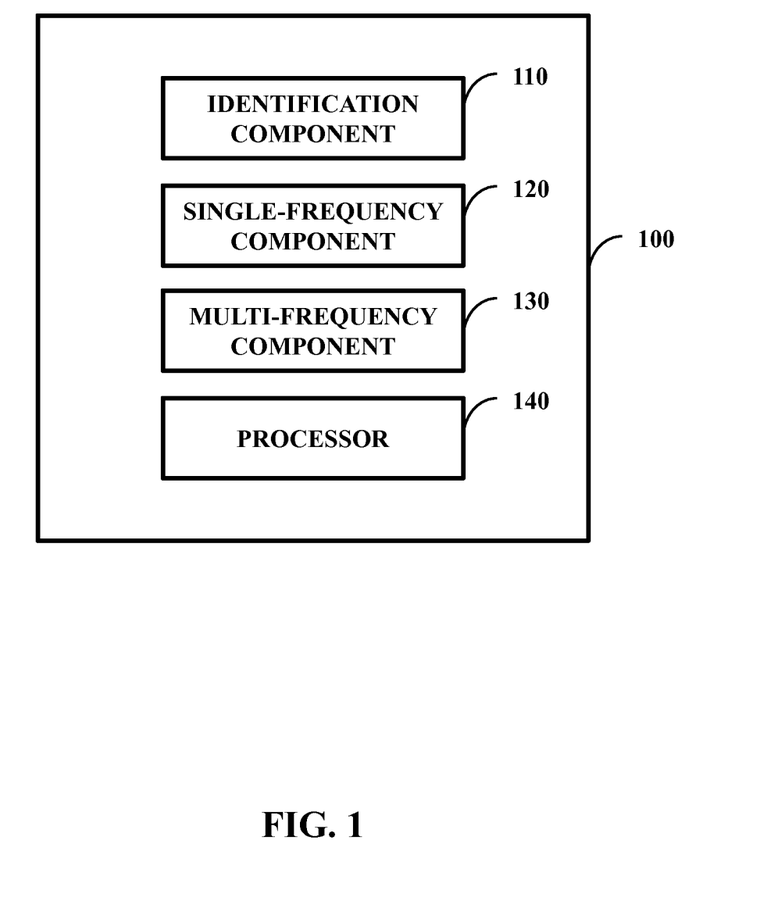
FIG. 1 illustrates one embodiment of a system comprising an identification component, a single-frequency component, a multi-frequency component, and a processor.

FIG. 1 illustrates one embodiment of a system 100 comprising an identification component 110, a single-frequency component 120, a multi-frequency component 130, and a processor 140. The identification component 110 is configured to determine if a reference signal is a single-frequency signal or multi-frequency signal. The identification component 110 can function to collect a signal and determine if the signal is a reference signal (e.g., a classification of the signal is unknown). In one embodiment, depending on if the reference signal is a single-frequency signal or a multi-frequency signal the system 100 (e.g., through use of a component) can determine which component of the single-frequency component 120 or the multi-frequency component 130 functions upon the reference signal (e.g., if the reference signal is a single-frequency signal, then the processor can determine that the single-frequency component 120 functions upon the reference signal and cause such functioning to occur).

If the reference signal is a single-frequency signal, then the single-frequency component 120 can function. In one embodiment, the single-frequency component 120 comprises a single-frequency measurement component, a single-frequency classification component, and a single-frequency confidence component. The single-frequency measurement component is configured to make a measurement of a frequency of the reference signal when the reference signal is the single-frequency signal. The a single-frequency classification component is configured to determine a single-frequency classification of the reference signal based, at least in part, on the measurement when the reference signal is the single-frequency signal. The single-frequency confidence component is configured to determine a confidence of the single-frequency classification, where a notice identifying the single-frequency classification is caused to be outputted (e.g., by the single-frequency component 120) in response to the confidence of the single-frequency classification meeting a single-frequency threshold value.

If the reference signal is a multi-frequency signal, then the multi-frequency component 130 can function. In one embodiment, the single-frequency component 120 comprises a multi-frequency classification component, a multi-frequency measurement component, and a single-frequency confidence component. The multi-frequency classification component is configured to determine a multi-frequency classification of the reference signal when the reference signal is the multi-frequency signal. The multi-frequency measurement component is configured to obtain a first result from a first band centered on a first frequency of the reference signal and configured to obtain a second result from a second band centered on a second frequency of the reference signal, where the first frequency and the second frequency are discrete frequencies. The multi-frequency confidence component configured to determine a confidence of the multi-frequency classification through use of the first result and the second result, where a notice identifying the multi-frequency classification is caused to be outputted (e.g., by the multi-frequency component 130) in response to the confidence of the multi-frequency classification meeting a multi-frequency threshold value.

The processor 140 can be configured to execute at least one instruction related to at least one component disclosed herein. In one example, the processor 140 is configured to execute at least one instruction related to the identification component, the single-frequency measurement component, the single-frequency classification component, the single-frequency confidence component, the multi-frequency classification component, the multi-frequency measurement component, the multi-frequency confidence component, or a combination thereof.

In one embodiment, the multi-frequency measurement component is configured to obtain the first result from the first band centered on the first frequency of the reference signal through use of a peak power spectral density of the first band. The multi-frequency measurement component can also be configured to obtain the second result from the second band centered on the second frequency of the reference signal through use of a peak power spectral density of the second band.

In one embodiment, the multi-frequency measurement component is configured to obtain the first result from the first band centered on the first frequency of the reference signal through integration of the peak power spectral density of the first band. The multi-frequency measurement component can be configured to obtain the second result from the second band centered on the second frequency of the reference signal through integration of the peak power spectral density of the second band.

In one embodiment, the multi-frequency threshold value is pre-defined. In one example, a programmer can define the multi-frequency threshold. In one embodiment, the single-frequency threshold value is pre-defined. In one example, the programmer can also define the single-frequency threshold value.

Figure 2:
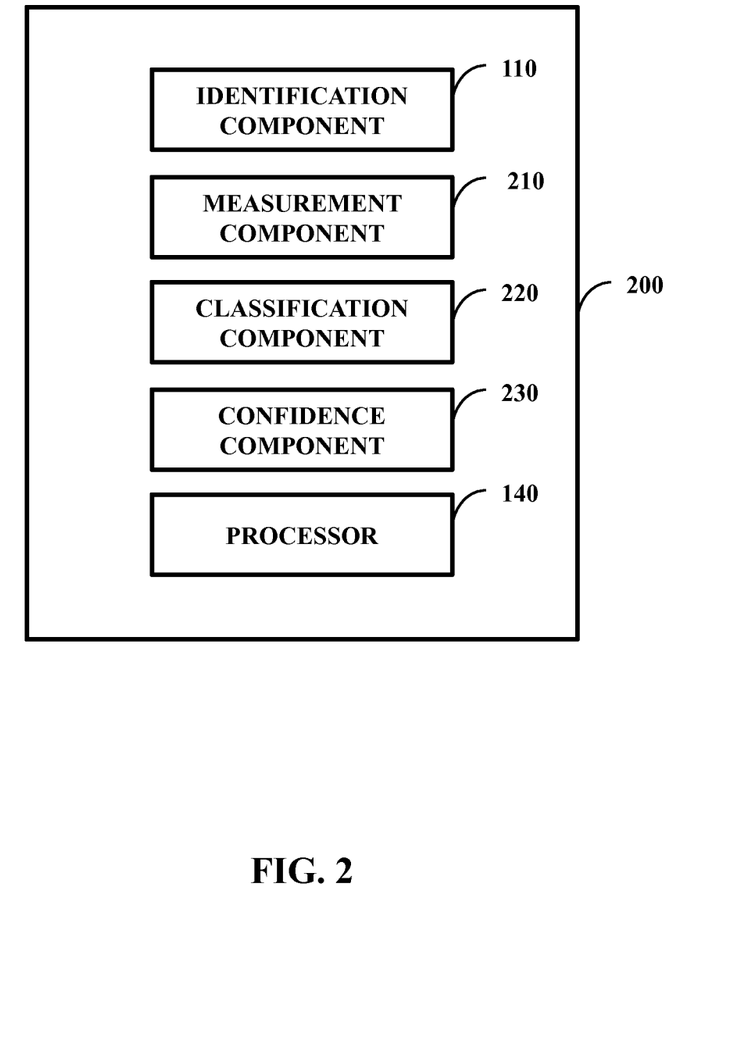
FIG. 2 illustrates one embodiment of a system comprising the identification component, a measurement component, a classification component, a confidence component, and the processor.

FIG. 2 illustrates one embodiment of a system 200 comprising the identification component 110, a measurement component 210, a classification component 220, a confidence component 230, and the processor 140. The system 200 shows a different configuration of components discussed in FIG. 1. In one example, as opposed to having components configured according to frequency-type components can be configured according to function-type. For example, the multi-frequency measurement component and the single-frequency measurement component can function as the measurement component 210.

Figure 3:
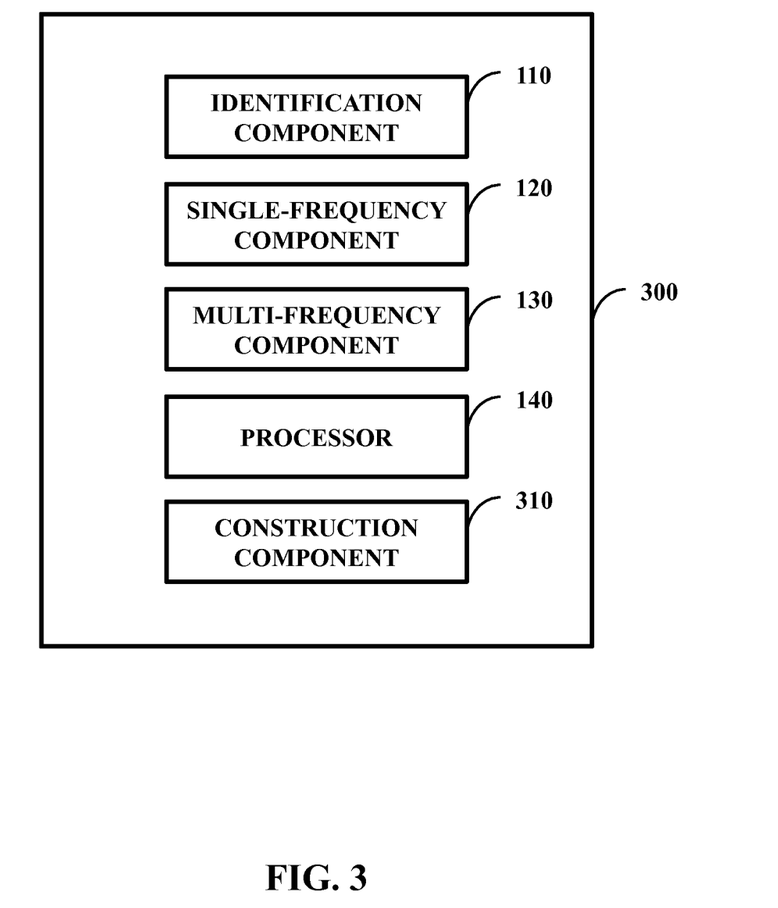
FIG. 3 illustrates one embodiment of a system comprising the identification component, the single-frequency component, the multi-frequency component, the processor, and a construction component.

FIG. 3 illustrates one embodiment of a system 300 comprising the identification component 110, the single-frequency component 120, the multi-frequency component 130, the processor 140, and a construction component 310. The construction component 310 is configured to construct a segment through use of the reference signal. Content of the segment that is constructed is used by the multi-frequency measurement component to obtain the first result and the second result.

In one embodiment a sub-segment is derived from the segment (e.g., by the construction component). Content of the sub-segment is used by the multi-frequency measurement component to obtain the first result and the second result. In one embodiment, the segment comprises multiple contiguous frames of the reference signal.

Figure 4:
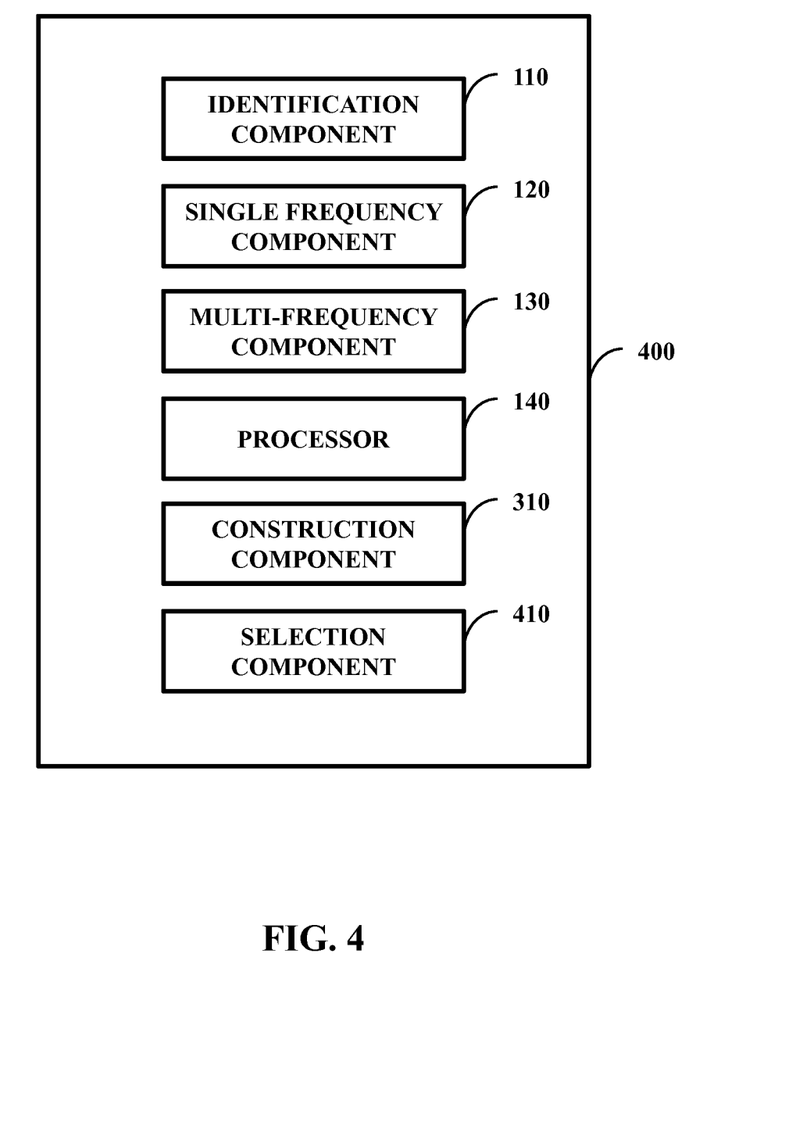
FIG. 4 illustrates one embodiment of a system comprising the identification component, the single-frequency component, the multi-frequency component, the processor, the construction component, and a selection component.

FIG. 4 illustrates one embodiment of a system 400 comprising the identification component 110, the single-frequency component 120, the multi-frequency component 130, the processor 140, the construction component 310, and a selection component 410. The selection component 410 is configured to select a reference frame of the reference signal, where the construction component 310 uses the reference frame in construction of the segment. The reference frame can be selected through an evaluation that identifies a best frame according to a criterion set, randomly, etc.

Figure 5:
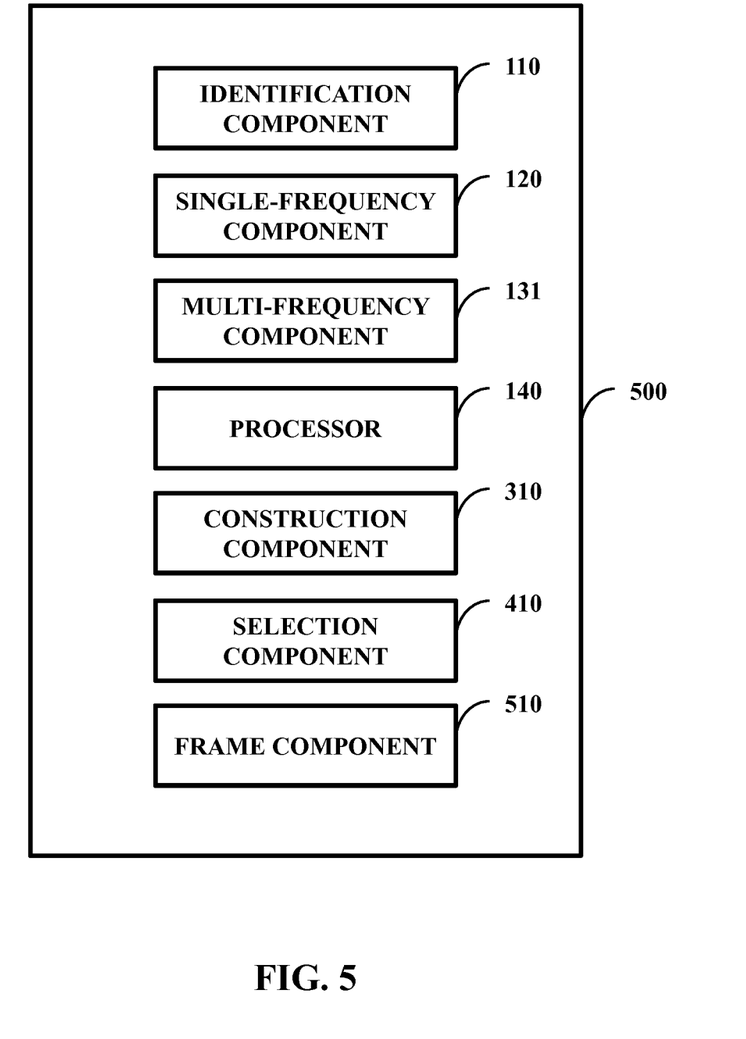
FIG. 5 illustrates one embodiment of a system comprising the identification component, the single-frequency component, the multi-frequency component, the processor, the construction component, the selection component, and a frame component.

FIG. 5 illustrates one embodiment of a system 500 comprising the identification component 110, the single-frequency component 120, the multi-frequency component 130, the processor 140, the construction component 310, the selection component 410, and a frame component 510. The frame component 510 is configured to calculate value of individual frames of the reference signal and configured to rate (e.g., rank) the frames of the reference signal based on their value (e.g., order the frames from highest to lowest), where the selection component selects the frame with a highest value.

Figure 6:
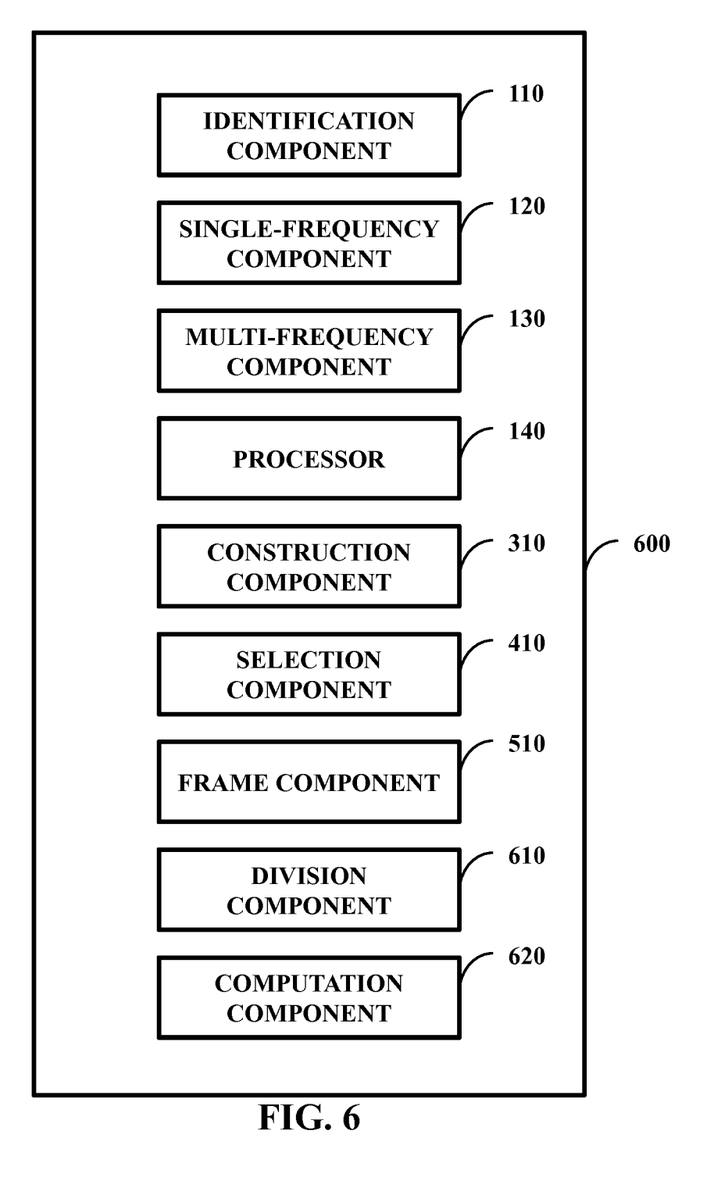
FIG. 6 illustrates one embodiment of a system comprising the identification component, the single-frequency component, the multi-frequency component, the processor, the construction component, the selection component, the frame component, a division component, and a computation component.

FIG. 6 illustrates one embodiment of a system 600 comprising the identification component 110, the single-frequency component 120, the multi-frequency component 130, the processor 140, the construction component 310, the selection component 410, the frame component 510, a division component 610, and a computation component 620. The division component 610 is configured to divide a received signal (e.g., divide the reference signal, divide the reference signal along with other parts of the received signal, etc.) into frames (e.g., frames of equal length). The computation component 620 is configured to compute a mean value for individual frames (e.g., two or more frames) produced from division of the received signal. The frame component 510 is configured to rate the frames based on the mean values computed for the individual frames.

Figure 7:
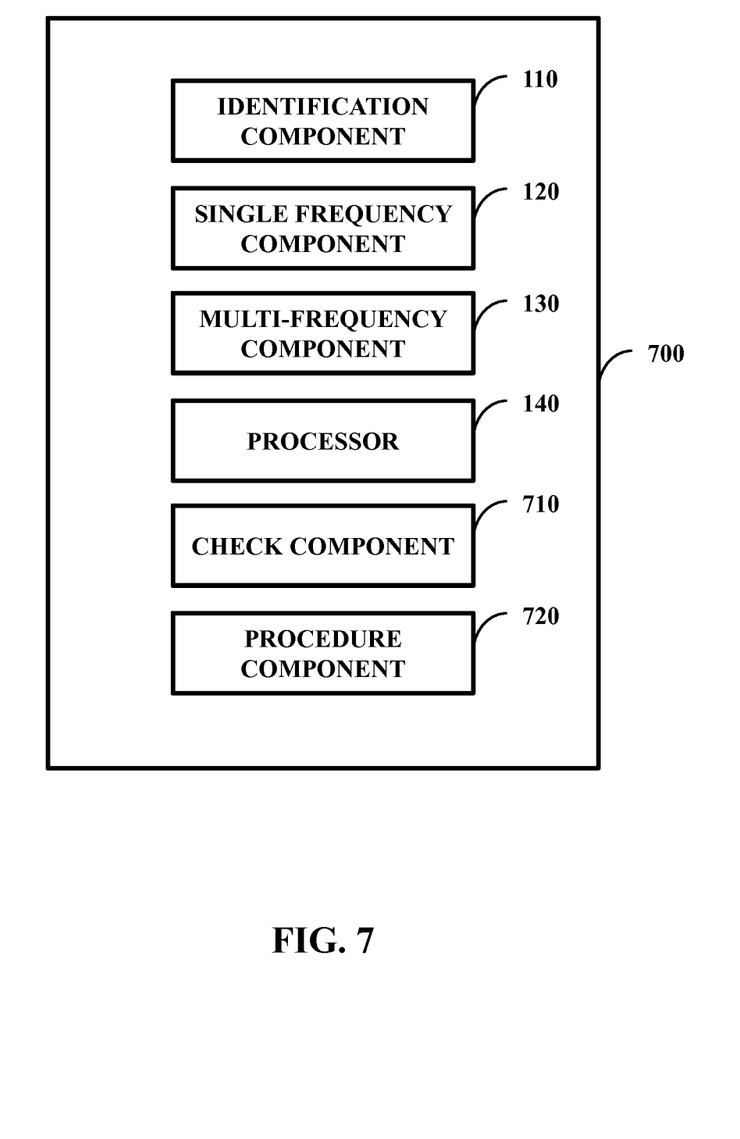
FIG. 7 illustrates one embodiment of a system comprising the identification component, the single-frequency component, the multi-frequency component, the processor, a check component, and a procedure component.

FIG. 7 illustrates one embodiment of a system 700 comprising the identification component 110, the single-frequency component 120, the multi-frequency component 130, the processor 140, a check component 710, and a procedure component 720. The check component 710 is configured to determine if a reference signal is in a baseband. The procedure component 720 is configured to process the reference signal in response to the reference signal being in the baseband (e.g., in response to the check component determining that the reference signal is in the baseband). The single-frequency measurement component can be configured to make the measurement of the frequency of the reference signal after being processed. The multi-frequency classification component can be configured to determine the multi-frequency classification of the reference signal after being processed.

In one embodiment, the procedure component 720 is configured to compute the power spectral density of the reference signal, where the single-frequency measurement component is configured to use the power spectral density in making the measurement of the frequency. The multi-frequency classification component can be configured to use the power spectral density in determining the multi-frequency classification.

Figure 8:
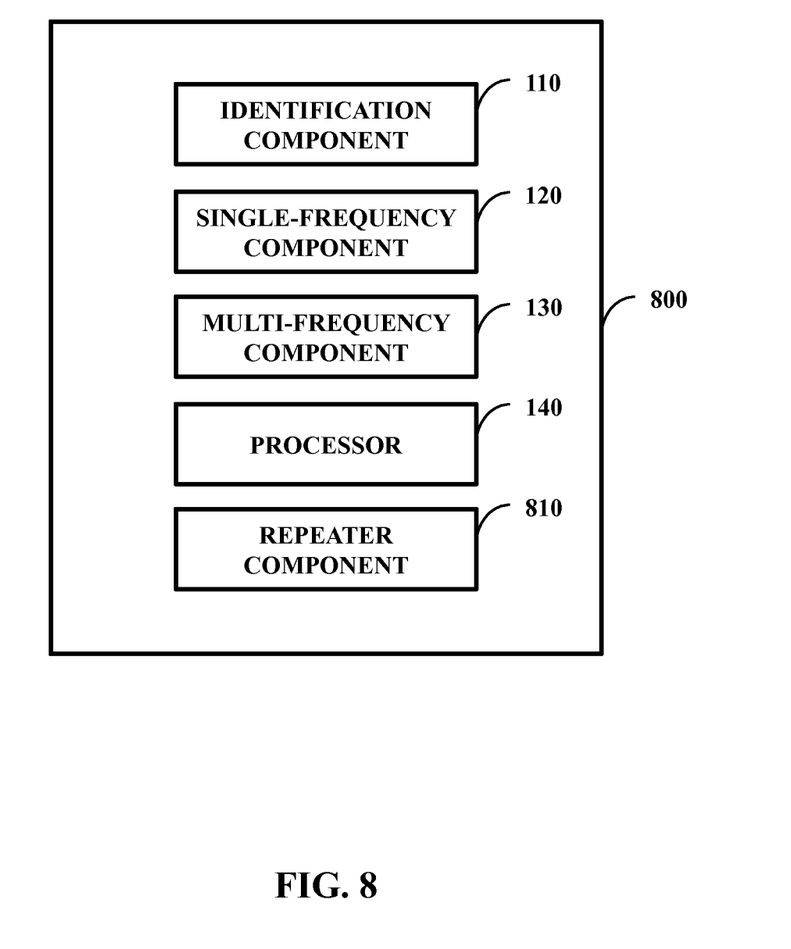
FIG. 8 illustrates one embodiment of a system comprising the identification component, the single-frequency component, the multi-frequency component, the processor, and a repeater component.

FIG. 8 illustrates one embodiment of a system 800 comprising the identification component 110, the single-frequency component 120, the multi-frequency component 130, the processor 140, and a repeater component 810. The repeater component 810 is configured to organize a repeat operation of at least one component of the system 800 (or other component disclosed herein) in response to the confidence of the single-frequency classification not meeting (e.g., reaching, exceeding, etc.) the single-frequency threshold value or in response to the confidence of the multi-frequency classification not meeting the multi-frequency threshold value.

In one example, the system 800 can function to identify a classification of the reference signal. However, the confidence associated with this classification may not meet a desired threshold (e.g., threshold set by the programmer). Various components can function again to either select a new classification or repeat the classification and determine if the repeat does meet the threshold.

Figure 9:
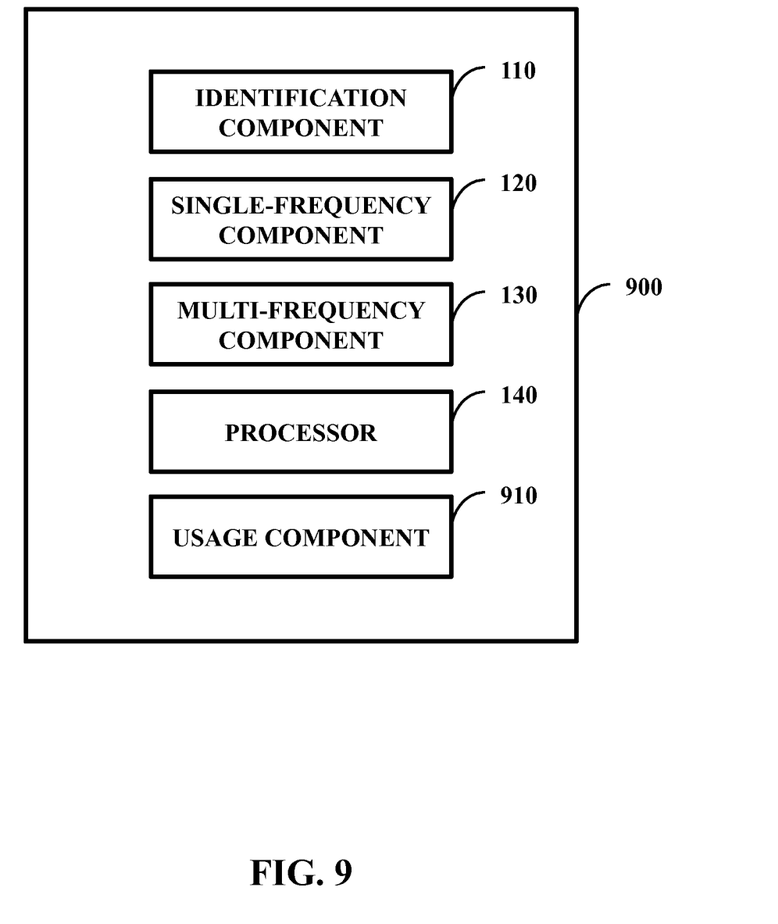
FIG. 9 illustrates one embodiment of a system comprising the identification component, the single-frequency component, the multi-frequency component, the processor, and a usage component.

FIG. 9 illustrates one embodiment of a system 900 comprising the identification component 110, the single-frequency component 120, the multi-frequency component 130, the processor 140, and a usage component 910. The usage component 910 is configured to use the classification to extract information from a communication signal that includes the reference signal.

Figure 10:
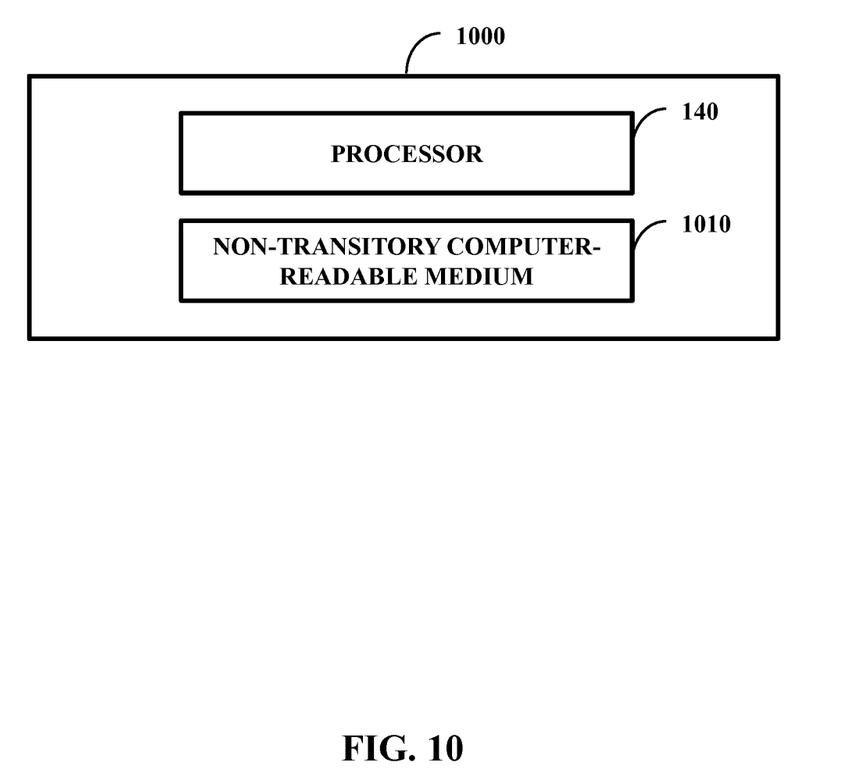
FIG. 10 illustrates one embodiment of a system comprising a processor and a non-transitory computer-readable medium.

FIG. 10 illustrates one embodiment of a system 1000 comprising the processor 140 and a non-transitory computer-readable medium 1010. In one embodiment, the non-transitory computer-readable medium 1010 can be configured to store computer-executable instructions that when executed by the processor 140 cause the processor 140 to perform at least part of a method disclosed herein. In one embodiment, the non-transitory computer-readable medium 1010 is communicatively coupled to the processor 140 and stores processor executable commands to facilitate operation of at least one component disclosed herein (e.g., the identification component 110 of FIG. 1, the single-frequency component 120 of FIG. 1, and the multi-frequency component 130 of FIG. 1).

In one embodiment, the system 1000 is an example of a signal classifier. The signal classifier, that is at least in part hardware, can be configured to perform a method, the method comprises discovering a confidence threshold, detecting a preferred frame of a particular frequency reference portion of a radio frequency signal, and constructing a segment of ordered frames of the radio frequency signal that are contiguous, where the ordered frames include the preferred frame. The method can also comprise identifying that radio frequency signal has a single frequency, identifying the single frequency of the radio frequency signal, as well as establishing a cutoff frequency of a low-pass filter to be above the single frequency. Additionally the method also comprises subjecting the radio frequency signal to the low-pass filter with the cutoff frequency above the single frequency to produce a signal output, normalizing the signal output to produce a normalized signal output, and demodulating the radio frequency signal through use of the normalized signal output to produce a baseband signal. The method can also determine a proposed classification of the baseband signal, a confidence level of the proposed classification, and if the confidence level meets the confidence threshold. The method additionally comprises recognizing the proposed classification as a recognized classification of the signal in response to the total confidence level meeting the confidence threshold and causing an output that identifies the signal as a signal of the recognized classification.

Figure 11:
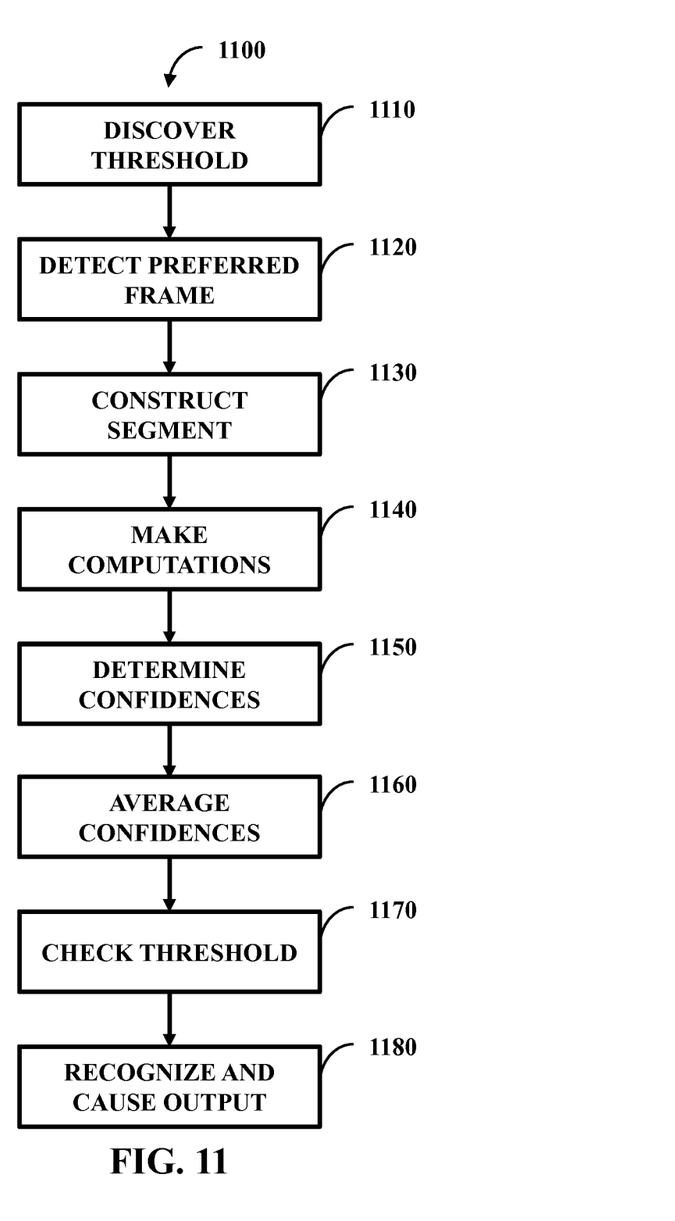
FIG. 11 illustrates one embodiment of a method comprising a set of actions.

FIG. 11 illustrates one embodiment of a method 1100 comprising a set of actions 1110-1180. At 1110 there can be receiving a signal and discovering a confidence threshold while at 1120 there is detecting a preferred frame of a repeating frequency portion of a signal. Along with receiving the signal there can be identifying that a signal (e.g., the demodulated radio frequency signal, the baseband signal, etc.) includes multiple frequencies, identifying a highest frequency of the multiple frequencies, and determining at least one of the first confidence level and the second confidence level (e.g., where the maximum frequency is above the highest frequency of the multiple frequencies). In one embodiment, the filter used in down-conversion and/or a component configured to perform an action of the method 1100 is part of the system 1000 of FIG. 10. The non-transitory computer-readable medium 1010 of FIG. 10 can retain a confidence threshold that is fixed or can be changed as new information is learned. The processor 140 of FIG. 10 can access the confidence threshold as a type of discovery. In addition, the non-transitory computer-readable medium 1010 of FIG. 10 can have a standard (e.g., supplied by the programmer) used to rate frames of the signal and based on this standard the preferred frame (e.g., frame that scores best based on the standard) can be detected. The standard used to detect the preferred frame can be set by the programmer.

At 1130 constructing a segment of ordered frames of the signal that are contiguous can take place (e.g., frames are next to one another without a break), where the ordered frames include the preferred frame. This construction can include identifying frames that are near the preferred frame and selecting at least one identified frame to be part of the ordered frames. In addition to constructing the segment, at 1130 there can be identifying of at least a first sub-segment of the segment and a second sub-segment of the segment that are different from one another.

At 1140 computations can be made (e.g., via the processor 140 of FIG. 1). These computations can include computing a first metric set for the segment and a second metric set of the segment. The first metric set is based on a first discrete frequency of the signal while the second metric set is based on a second discrete frequency of the signal. Also at 1140 there can be identifying that the signal is already in a baseband after reception of the signal along with computing a power spectrum density of the signal. In one embodiment, 1140 includes identifying that the signal is a radio frequency signal, performing processing on the radio frequency signal to produce a processed signal, computing a power spectrum density of the processed signal. Performing processing on the radio frequency signal can, in one embodiment, comprise subjecting the radio frequency signal to down-conversion to produce a down-converted signal output, filtering the down-converted signal to produce a filter output (e.g., passing that output through an appropriate filter), normalizing the filter output to produce a normalized signal output, and demodulating the normalized signal output to produce a baseband signal, where the baseband signal is the processed signal.

At 1150 there is determining a first confidence level of the first sub-segment through use of the first metric set along with determining a second confidence level of the second sub-segment through use of the second metric set. In one embodiment, the power spectrum density is used in determining the first confidence level and in determining the second confidence level.

At 1160 calculating (e.g., via the processor) a total confidence level through averaging at least the first confidence level and the second confidence level occurs and at 1170 determining if the total confidence level meets the confidence threshold occurs. At 1180 recognizing a classification of the signal in response to the total confidence level meeting the confidence threshold and causing an output that identifies the signal as a signal of the classification take place.

What is claimed is:

1. A system, comprising:
an identification component configured to determine if a reference signal is a single-frequency signal or a multi-frequency signal;
a single-frequency measurement component configured to make a measurement of a frequency of the reference signal when the reference signal is the single-frequency signal;
a single-frequency classification component configured to determine a single-frequency classification of the reference signal based, at least in part, on the measurement when the reference signal is the single-frequency signal;
a single-frequency confidence component configured to determine a confidence of the single-frequency classification, where a notice identifying the single-frequency classification is caused to be outputted in response to the confidence of the single-frequency classification meeting a single-frequency threshold value and where the notice identifying the single-frequency classification is used in classification and demodulation of the reference signal;
a multi-frequency classification component configured to determine a multi-frequency classification of the reference signal when the reference signal is the multi-frequency signal;
a multi-frequency measurement component configured to obtain a first result from a first band centered on a first frequency of the reference signal and configured to obtain a second result from a second band centered on a second frequency of the reference signal, where the first frequency and the second frequency are discrete frequencies;
a multi-frequency confidence component configured to determine a confidence of the multi-frequency classification through use of the first result and the second result, where a notice identifying the multi-frequency classification is caused to be outputted in response to the confidence of the multi-frequency classification meeting a multi-frequency threshold value and where the notice identifying the multi-frequency classification is used in classification and demodulation of the reference signal; and
a processor configured to execute at least one instruction related to the identification component, the single-frequency measurement component, the single-frequency classification component, the single-frequency confidence component, the multi-frequency classification component, the multi-frequency measurement component, the multi-frequency confidence component, or a combination thereof.

2. The system of claim 1, comprising:
a construction component configured to construct a segment through use of the reference signal, where content of the segment is used by the multi-frequency measurement component to obtain the first result and the second result.

3. The system of claim 2, comprising:
a selection component configured to select a reference frame of the reference signal, where the construction component uses the reference frame in construction of the segment.

4. The system of claim 3, comprising:
a frame component configured to calculate a value of individual frames of the reference signal and configured to rate the individual frames of the reference signal based on their value, where the selection component selects a frame with a highest value from the individual frames to be the reference frame.

5. The system of claim 4, comprising:
a division component configured to divide the reference signal into the individual frames; and
a computation component configured to compute a mean value for the individual frames produced from division of the reference signal, where the frame component is configured to rate the individual frames based on the mean values computed for the individual frames.

6. The system of claim 2, where a sub-segment is derived from the segment and where content of the sub-segment is used by the multi-frequency measurement component to obtain the first result and the second result.

7. The system of claim 2, where the segment comprises multiple contiguous frames of the reference signal.

8. The system of claim 1, comprising:
a check component configured to determine if a reference signal is in a baseband; and
a procedure component configured to process the reference signal in response to the reference signal being in the baseband, where the single-frequency measurement component is configured to make the measurement of the frequency of the reference signal after being processed and where the multi-frequency classification component is configured to determine the multi-frequency classification of the reference signal after being processed.

9. The system of claim 8, where the procedure component is configured to compute a power spectral density of the reference signal, where the single-frequency measurement component is configured to use the power spectral density to make the measurement of the frequency and where the multi-frequency classification component is configured to use the power spectral density in determination of the multi-frequency classification.

10. The system of claim 1, where the multi-frequency measurement component is configured to obtain the first result from the first band centered on the first frequency of the reference signal through use of a peak power spectral density of the first band and configured to obtain the second result from the second band centered on the second frequency of the reference signal through use of a peak power spectral density of the second band.

11. The system of claim 10, where the multi-frequency measurement component is configured to obtain the first result from the first band centered on the first frequency of the reference signal through integration of the peak power spectral density of the first band and configured to obtain the second result from the second band centered on the second frequency of the reference signal through integration of the peak power spectral density of the second band.

12. The system of claim 1, where the multi-frequency threshold value is pre-defined and where the single-frequency threshold value is pre-defined.

13. The system of claim 1, comprising:
a repeater component configured to organize a repeat operation of at least one component of the system in response to the confidence of the single-frequency classification not meeting the single-frequency threshold value or in response to the confidence of the multi-frequency classification not meeting the multi-frequency threshold value.

14. The system of claim 1, comprising:
a usage component configured to use the single-frequency classification to extract information from a communication signal that includes the reference signal when the reference signal is the single-frequency signal and configured to use the multi-frequency classification to extract information from a communication signal that includes the reference signal when the reference signal is the multi-frequency signal.

15. A method, comprising:
executing instructions from a signal classifier that comprises a computer-readable medium and a processor, the instructions comprising:
discovering a confidence threshold;
detecting a preferred frame of a repeating frequency portion of a signal;
constructing a segment of ordered frames of the signal that are contiguous, where the ordered frames include the preferred frame;
computing a first metric set for the segment, where the first metric set is based on a first discrete frequency of the signal;
computing a second metric set for the segment, where the second metric set is based on a second discrete frequency of the signal;
determining a first confidence level of a first sub-segment of the segment through use of the first metric set;
determining a second confidence level of a second sub-segment of the segment through use of the second metric set, where the first sub-segment and the second sub-segment are different sub-segments;
calculating a total confidence level through averaging at least the first confidence level and the second confidence level;
determining if the total confidence level meets the confidence threshold;
recognizing a classification of the signal in response to the total confidence level meeting the confidence threshold; and
causing an output that identifies the signal as a signal of the classification.

16. The method of claim 15, the instructions comprising:
receiving the signal;
identifying that the signal is already in a baseband after reception of the signal; and
computing a power spectrum density of the signal, where the power spectrum density is used in determining the first confidence level and in determining the second confidence level.

17. The method of claim 15, the instructions comprising:
receiving the signal;
identifying that the signal is a radio frequency signal;
performing processing on the radio frequency signal to produce a processed signal; and
computing a power spectrum density of the processed signal, where the power spectrum density is used in determining the first confidence level and in determining the second confidence level.

18. The method of claim 17, where performing processing on the radio frequency signal comprises:
subjecting the radio frequency signal to a down-conversion to produce a down-converted signal;
filtering the down-converted signal to produce a filter output;
normalizing the filter output to produce a normalized signal output; and
demodulating the normalized signal output to produce a baseband signal, where the baseband signal is the processed signal.

19. The method of claim 18, the instructions comprising:
identifying that the baseband signal includes multiple frequencies;
identifying a highest frequency of the multiple frequencies; and
establishing a maximum frequency for use in determining at least one of the first confidence level and the second confidence level, where the maximum frequency is above the highest frequency of the multiple frequencies.

20. A signal classifier, that comprises a processor and a non-transitory computer-readable medium, configured to perform a method, the method comprising:
discovering a confidence threshold;
detecting a preferred frame of a particular frequency reference portion of a radio frequency signal;
constructing a segment of ordered frames of the radio frequency signal that are contiguous, where the ordered frames include the preferred frame;
identifying that the radio frequency signal has a single frequency;
identifying the single frequency of the radio frequency signal;
establishing a cutoff frequency to be above the single frequency;
subjecting the radio frequency signal to the cutoff frequency that is above the single frequency to produce a signal output;
normalizing the signal output to produce a normalized signal output;
demodulating the radio frequency signal through use of the normalized signal output to produce a baseband signal;
determining a proposed classification of the baseband signal;
determining a confidence level of the proposed classification;
determining if the confidence level meets the confidence threshold;

recognizing the proposed classification as a recognized classification of the signal in response to the confidence level meeting the confidence threshold; and causing an output that identifies the signal as a signal of the recognized classification.

* * * * *